United States Patent
Monaghan (10) Patent No.: US 11,605,067 B2
(45) Date of Patent: Mar. 14, 2023

(54) DYNAMIC TAG BASED IDENTIFICATION FOR SELF AND ASSISTED TRANSACTIONS

(71) Applicant: NCR Corporation, Duluth, GA (US)

(72) Inventor: Andrew David Monaghan, Dundee (GB)

(73) Assignee: NCR Corporation, Atlanta, GA (US)

( * ) Notice: Subject to any disclaimer, the term of this patent is extended or adjusted under 35 U.S.C. 154(b) by 171 days.

(21) Appl. No.: 15/992,275

(22) Filed: May 30, 2018

(65) Prior Publication Data

US 2019/0370780 A1    Dec. 5, 2019

(51) Int. Cl.
*G06Q 20/32* (2012.01)
*G06Q 20/20* (2012.01)

(52) U.S. Cl.
CPC ....... *G06Q 20/3278* (2013.01); *G06Q 20/204* (2013.01)

(58) Field of Classification Search
CPC .... G07G 1/009; G07G 1/0045; G07G 1/0009; G06Q 20/204; G06Q 20/3278; G06Q 20/322; G06Q 20/4037; G06Q 20/20; G06Q 20/202; G06Q 20/209; G06Q 30/0238; G06Q 30/0268; G03G 21/1657; G06F 19/323; G06F 2212/178; G09F 3/0335; G16H 10/65; H01H 2300/032; H04M 2250/04; H04Q 1/138; H04Q 2209/47; H04W 4/008; H04W 4/80; H04W 12/00407; G07B 2017/00225; G05B 2219/31197; G06K 7/10237; G06K 7/10247; B60R 2325/103; G07F 7/088
See application file for complete search history.

(56) References Cited

U.S. PATENT DOCUMENTS

| | | | | |
|---|---|---|---|---|
| 9,852,418 | B2* | 12/2017 | Mardikar | G06Q 20/32 |
| 2010/0169154 | A1* | 7/2010 | Kraft | G06Q 30/0601 |
| | | | | 705/7.29 |
| 2015/0058145 | A1* | 2/2015 | Luciani | G06Q 20/204 |
| | | | | 705/17 |
| 2016/0148182 | A1* | 5/2016 | Craine | G06Q 20/401 |
| | | | | 705/16 |
| 2016/0239820 | A1* | 8/2016 | Klingen | G06Q 20/3278 |
| 2017/0255915 | A1* | 9/2017 | Chandrasekaran | |
| | | | | H04L 63/0492 |

FOREIGN PATENT DOCUMENTS

KR    20150129340 A    * 11/2015

* cited by examiner

*Primary Examiner* — Peter Ludwig
*Assistant Examiner* — Avia Salman
(74) *Attorney, Agent, or Firm* — Schwegman, Lundberg & Woessner (57) ABSTRACT

A transaction terminal dynamically and regularly changes a unique transaction terminal identifier (ID). The transaction terminal ID is reported to a remote manager. During a transaction, a mobile device automatically reads a current transaction terminal ID from the transaction terminal, appends a mobile device ID for the mobile device, and sends the transaction terminal ID with the mobile device ID to the remote manager. The remote manager links the mobile ID to details associated with a user of the mobile device and sends the details to the transaction terminal. The transaction terminal uses the details to customize a transaction being conducted by the user at the transaction terminal.

8 Claims, 4 Drawing Sheets

DYNAMIC TAG BASED IDENTIFICATION FOR SELF AND ASSISTED TRANSACTIONS

BACKGROUND

Near Field Communication (NFC) provides a frictionless approach for a consumer to use their mobile device and identify/authenticate himself/herself for self-service or assisted transactions across retail and financial industries. Both Android® and iOS® provides Operating System (OS) support for NFC Europay Mastercard® and Visa® (EMV) based digital wallets that allow financial institutions to provision EMV cards.

However, NFC EMV transaction processing has some problems. The cards provisioned in the digital wallet use tokens that cannot be mapped back to an individual card holder. The tokenization process inhibits functionality for individual preferences, individual targeted messaging for communication with the individual, and pre-staged transactions because the tokens cannot be mapped during a transaction to a specific individual. Issuer networks (Visa®, Mastercard®, etc.) can offer financial institutions/retailers an Application Programming Interface (API) to translate the token back to an individual user's identifier; however, there is a cost associated with each such API call placed on the financial institution/retailer.

Furthermore, the complexity of establishing a relationship between the financial institution/retailer with multiple digital wallet providers and card payment networks make solutions expensive and complex to implement.

NFC also supports an alternative standard where the mobile device is a reader that can read NFC tags, however these tags are conventionally passive and static, such that the NFC identifiers are susceptible to being cloned, which means the NFC identifier can be cloned and compromised posing a security threat to financial institutions/retailers that utilize this alternative standard.

In fact, financial institutions/retailers want a cost effective and easy to integrate solution for utilizing the convenience of NFC technology.

SUMMARY

In various embodiments, methods and a system for dynamic tag-based identification for self and assisted transaction processing are provided.

According to an embodiment, a method for dynamic tag-based identification for self and assisted transaction processing is presented. More particularly, a dynamic identifier associated with a transaction terminal is received from the transaction terminal. The dynamic identifier with a mobile device identifier is obtained from a mobile device. Customized transaction details for a user that operates the mobile device is linked to the mobile device identifier. Finally, the customized transaction details are caused to be provided to the transaction terminal to customize a transaction conducted by the user at the transaction terminal.

DETAILED DESCRIPTION

Figure 1:
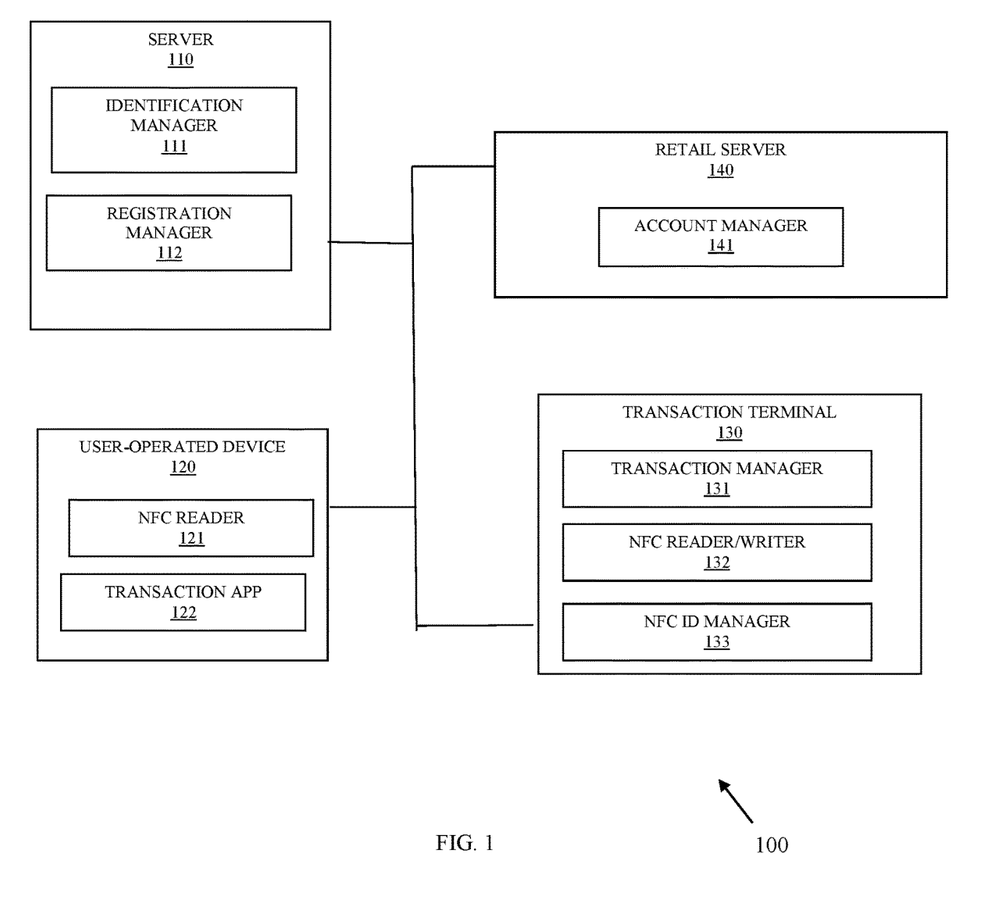
FIG. 1 is a diagram of a system for dynamic tag-based identification for self and assisted transaction processing, according to an example embodiment.

FIG. 1 is a diagram of a system 100 for dynamic tag-based identification for self and assisted transaction processing, according to an example embodiment. The various components are illustrated and the arrangement of the components is presented for purposes of illustration only. It is to be noted that other arrangements with more or less components are possible without departing from the dynamic tag-based identification for self and assisted transaction teachings presented herein and below.

The techniques, methods, and system presented herein and below for dynamic tag-based identification for self and assisted transaction processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

As used herein the terms "tag," "token," and "identifier" may be used synonymously and interchangeably and refers to a unique string of characters and/or digits that unique identifies a resource. A resource can include a device, a user, a storage container/file, and/or a system. In some embodiments, the tag, token, or identifier can be encrypted and/or digitally signed by another resource.

The system 100 includes a server 110 having at least one hardware processor, memory, and non-transitory computer-readable storage. The processor executes instructions representing an identification manager 111 and a registration manager 112.

The system 100 also includes a user-operated device 120 having at least one hardware processor, memory, and non-transitory computer-readable storage. The processor executes instructions that represent a transaction application (app) 122. The user-operated device 120 also includes an NFC reader 121 and an OS that supports NFC communication with the NFC reader 121.

The system 100 further includes a transaction terminal 130. The transaction terminal 130 includes at least one hardware processor, memory, and non-transitory computer-readable storage. The processor executes instructions representing a transaction manager 131 and NFC identifier (ID) manager 133. The transaction terminal 130 also includes an NFC reader/writer 132 and an OS that supports NFC communication with the NFC reader/writer 132.

Finally, the system 100 includes, optionally, at least one retail server 140. The retail server 140 includes at least one hardware processor, memory, and non-transitory computer-readable storage. The processor executes instructions representing a customer account manager 141.

Conventionally, NFC-based transaction processing occurred as follows. NFC Data Exchange Format (NDEF) records representing a card (EMV) provisioned on the mobile device of a user is read by a transaction terminal as a card token for a payment method. The token was transmitted from the transaction terminal with transaction details to a card payment service. The card payment service associated the token with a specific card account and processed payment for the transaction. This was done at the conclusion of the transaction when payment was needed from the user for goods and services that the user was purchasing. The retailer associated with the transaction terminal, in this conventional approach, has no automated mechanism for identifying the user or associating the user with a customer account held by the retailer.

The process flow of this conventional approach is reversed herein and enhanced in the manners discussed below to provide dynamic tag-based identification for self and assisted transaction processing. This provides added security (as discussed below) and provides retailer integration with an account of a customer during the transaction, such that customer preferences can be processed during the transaction and metrics/information with respect to the customer can be collected to better service the customer in subsequent transactions with the retailer.

The transaction terminal 130 is equipped with an NFC reader/writer 131 providing the ability for the transaction terminal 130 to dynamically change its NFC tag identifier (ID). The NFC ID becomes a dynamic and active data structure that is no longer static and passive (which is the conventional approach). The NFC reader/writer 132 includes a dynamic tag chip (I2C interface) or utilizes emulation via a contactless card reader to dynamically change the NFC tag ID for the transaction terminal 130.

The NFC ID manager 133 is configured to dynamically interact with the NFC reader/writer based on predefined periods/intervals of time and/or events at the transaction terminal 130 to have the NFC reader/writer 132 dynamically and randomly change the NFC tag ID for the transaction terminal 130.

In an embodiment, the predefined period/interval is every 30 seconds.

In an embodiment, the event is a completed transaction raised by or detected from the transaction manager 131, such that the NFC ID manager 133 causes the NFC reader/writer 132 to randomly change the NFC tag ID at the conclusion of each transaction processed on the transaction terminal.

In an embodiment, the predefined period/interval and/or events are configured items associated with processing the NFC ID manager 133.

When the NFC ID for the transaction terminal 130 is changed, the NFC ID manager 133 reports the changed NFC tag ID to the identification manager 111 of the server 110.

The identification manager 111 maintains a mapping between the transaction terminal 130 and its current NFC ID.

In an embodiment, the identification manager 111 maintains two NFC tag IDs for each transaction terminal 130 one representing the current reported NFC tag ID and one representing the last reported NFC tag ID before it was changed to the current reported NFC tag ID. This allows a transaction being processed to ensure proper association with the transaction terminal 130 because the NFC tag ID for the transaction terminal 130 may change from a start of a transaction to a new NFC tag ID before the conclusion of the transaction. This allows for the NFC ID manager 133 to asynchronously change the NFC tag ID for the transaction terminal through the NFC reader/writer 132 without regard to any transaction processing that occurs on the transaction terminal 130.

The registration manager 112 provides an interface to the transaction app 122 over a wireless network connection between the user-operated device 120 and the server 110.

The registration manager 112 may also provide a browser-based interface for performing initial user registration, which can be done on any computing device with wired or wireless connectivity utilizing a browser.

A user initially registers a user-operated device ID (such as a phone number or Media Access Control (MAC) address through the transaction app 122 (or separately through a browser that may or may not be processed on the user-operated device 120. During registration, the user may also link accounts through an account or user identifier that the user has with one or more retailers, such as a user identifier associated with a user account by the account manager 141 of the retail server 140. So, the user registers the device ID for device 120 and links retail accounts by identifying the retailers and providing at least one piece of information (user identifier, phone number, etc.) that the account manager 141 for each selected retailer would use to unique identify the user's account with that selected retailer.

The registration information provided by the user to the registration manager 112 is organized as files within a database that is accessible to the identification manager 111.

When a user approaches the transaction terminal 130 (after having registered with the registration manager 112, the user taps the device 120 in a location identified on the transaction terminal 130. The OS of the device 120 permits reading through the NFC tap, the current NFC tag ID for the transaction terminal 130. This activates the transaction app 122, the transaction app 122, sends the current NFC tag ID of the transaction terminal 130 along with the device ID for the device 120 to the identification manager 111. The identification manager 112 sends the user identifying information associated with an account of the retailer linked to the device ID for the device 120 back to the transaction manager 131 for initiating a transaction between the user and the transaction terminal 130. The transaction terminal sends the user identifying information to the account manager 141. The account manager 141 uses the user identifying information to locate the user's account with the retailer.

When a user has pre-staged a transaction for processing in advance of the initial interaction with the transaction terminal 130, the account manager 141 sends the information regarding the pre-staged transaction to the transaction manager 131. The user is presented through an interface of the transaction manager 131 with the pre-staged transaction and asked if this is the transaction the user wants to process, if it is, then the transaction manager 131 processes the transaction. The user can make changes through the interface to the pre-staged transaction if desired before the transaction manager 131 processes the transaction. The transaction manager 131 may also require some authentication for completing the transaction, such as entry of a user Personal Identification Number (PIN) or entry of a transaction passcode for processing the pre-staged transaction.

In an embodiment, the pre-staged transaction is a cash withdrawal from an account of the user with a retailer that is a financial institution, such as a bank of the user. The transaction terminal 130 in this embodiment is an Automated Teller Machine (ATM).

If the user has no pre-staged transactions for processing, the account manager 141 sends the transaction manager 131 user transaction preferences. For example, a payment method registered in the account of the user, a loyalty account number, a font-size for the display screen information of the transaction terminal 130, a written language for presenting information to the user for the transaction, an audio level for providing audio feedback during the transaction, a brightness for information presented to the user for the transaction, and the like. The transaction manager 131 configures the appropriate peripherals and the transaction with the user preferences provided by the account manager 141.

In this way, the transaction is customized and the user is not required to: transmit from the device 120 any payment card details for the transaction; manually enter any card into a card reader; manually enter any card number for payment into a touch screen interface or keypad at the transaction terminal 130. Furthermore, the user's loyalty number/account is automatically acquired for transaction credit with the retailer, such that it does not have to be provided by the user during the transaction at the transaction terminal 130. Additionally, visual and audio feedback settings are automatically configured for the transaction without any action being required by the user at the transaction terminal 130. Also, as stated above, the user can automatically process pre-staged transaction with little to no required user interaction.

All of this is achieved without a digital wallet or digital wallet application, which can vary widely in the industry, such that the processing provided is more secure (no transmission of any payment card token during the transaction) and more interoperable with a plurality of payment cards of the user (the processing is independent of any particular payment card and its required interfaces).

In an embodiment, the transaction terminal 130 is a Self-Service Terminal (SST). In an embodiment, the SST is a kiosk. In an embodiment, the kiosk is a fuel pump. In an embodiment, the kiosk is a self-service grocery store checkout. In an embodiment, the kiosk is a travel or hospitality kiosk. In an embodiment, the SST is an ATM.

In an embodiment, the transaction terminal 130 is a Point-Of-Sale (POS) terminal operated by a cashier to assist during customer checkout.

In an embodiment, the server 110 is a cloud processing environment processed on a plurality of servers that cooperate as a single logical server.

In an embodiment, the processing of the identification manager 111, the registration manager 112, and the account manager 141 both process in the same processing environment, such that just a single server performs the processing of servers 110 and 140.

In an embodiment, the user-operated device 120 is one of: a mobile phone, a table, a wearable processing device, and a smart portable Internet-of-Things (IOT) device (such as a key fob or Universal Serial Bus (USB) device with storage, processing, and networking capabilities).

These embodiments and other embodiments are now discussed with reference to the FIGS. 2-4.

Figure 2:
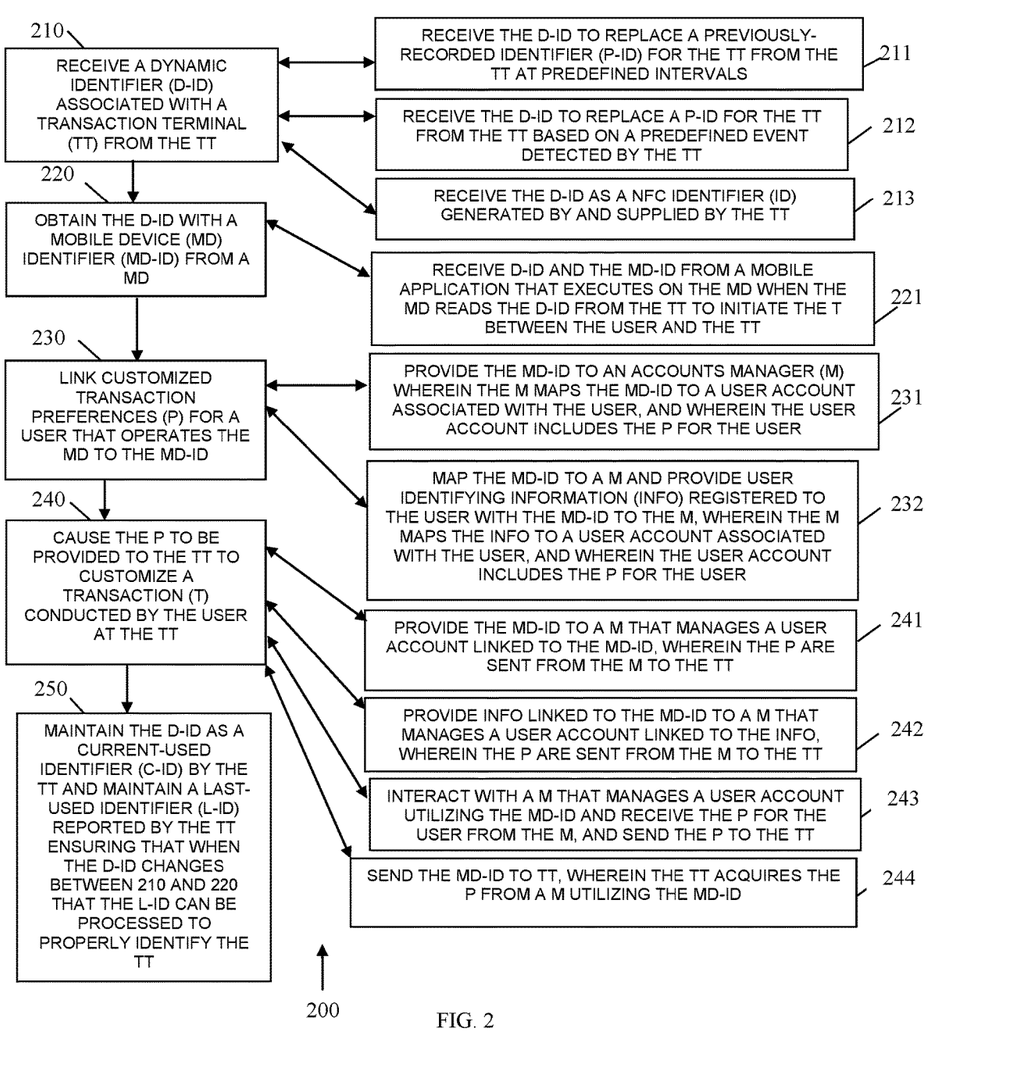
FIG. 2 is a diagram of a method for dynamic tag-based identification for self and assisted transaction processing, according to an example embodiment.

FIG. 2 is a diagram of a method 200 for dynamic tag-based identification for self and assisted transaction processing, according to an example embodiment. The software module(s) that implements the method 200 is referred to as a "dynamic tag-based identification transaction manager." The dynamic tag-based identification transaction manager is implemented as executable instructions programmed and residing within memory and/or a non-transitory computer-readable (processor-readable) storage medium and executed by one or more processors of a device. The processor(s) of the device that executes the dynamic tag-based identification transaction manager are specifically configured and programmed to process the dynamic tag-based identification transaction manager. The dynamic tag-based identification transaction manager has access to one or more networks during its processing. The networks can be wired, wireless, or a combination of wired and wireless.

In an embodiment, the dynamic tag-based identification transaction manager is all of, or some combination of 111, 112, and/or 141.

In an embodiment, the device that executes the dynamic tag-based identification transaction manager is the server 110 and/or the server 140.

In an embodiment, the device that executes the dynamic tag-based identification transaction manager is a cloud processing environment.

At 210, the dynamic tag-based identification transaction manager receives a dynamic identifier associated with a transaction terminal. The dynamic tag-based identification transaction manager receives the dynamic identifier from the transaction terminal. Further, the dynamic identifier is continuously changing and is changed by the transaction terminal. The dynamic identifier uniquely identifies the transaction terminal.

In an embodiment, at 211, the dynamic tag-based identification transaction manager receives the dynamic identifier to replace a previously-recorded identifier for the transaction terminal from the transaction terminal at predefined intervals. In an embodiment, the predefined interval is approximately 30 seconds.

In an embodiment, at 212, the dynamic tag-based identification transaction manager receives the dynamic identifier to replace a previous-recorded identifier for the transaction and received from the transaction terminal based on a predefined event detected by the transaction terminal. In an embodiment, the predefined event is a successful conclusion of a transaction processed at the transaction terminal.

In an embodiment, at 213, the dynamic tag-based identification transaction manager receives the dynamic identifier as an NFC tag identifier generated and dynamically changed at predefined intervals or based on events by the transaction manager utilizing a NFC reader/writer, such as NFC reader/writer 132.

At 220, the dynamic tag-based identification transaction manager obtains the dynamic identifier with a mobile device identifier provided by a mobile device. In an embodiment, the mobile device is device 120 and the mobile device provides the dynamic identifier with the mobile device identifier through transaction app 122. In an embodiment, the mobile device reads the dynamic identifier from the transaction terminal as an NFC tag/identifier, the mobile device's OS supporting NFC and the mobile device including an NFC reader that reads the dynamic identifier when the mobile device is tapped in proximity to the NFC tag of the transaction terminal. When the dynamic tag-based identification transaction manager receives the dynamic identifier from the mobile device this provides an indication that the mobile device is in proximity and located at the transaction terminal for initiation of a transaction between the user who operates the mobile device and the transaction terminal.

In an embodiment, at 221, the dynamic tag-based identification transaction manager receives the dynamic identifier and the mobile device identifier from a mobile application (e.g., transaction app 122) that executes on the mobile device when the mobile device reads the dynamic identifier from the transaction terminal to initiate a transaction between the user and the transaction terminal.

At 230, the dynamic tag-based identification transaction manager links customized transaction preferences (hereinafter just "preferences") for a user that operates the mobile device to the mobile device identifier. The user previously performing registration with the dynamic tag-based identification transaction manager utilizing the registration manager 112.

In an embodiment, at 231, the dynamic tag-based identification transaction manager provides the mobile device identifier to an accounts manager (e.g., account manager 141). The account manager maintains a mapping between the mobile device identifier and a user account for a user. The user account including the preferences for the user.

In an embodiment, at 232, the dynamic tag-based identification transaction manager maps the mobile device identifier to an accounts manager (e.g., account manager 141) and provides the account manager with user identifying information (email, phone number, user account identifier, etc.) that was previously registered by the user through the registration manager 112 (as was discussed above with the discussion of the FIG. 1 and system 100). The account manager maps the user identifying information to a user account associated with the user, and the user account including the preferences for the user.

At 240, the dynamic tag-based identification transaction manager causes the preferences to be provided to the transaction terminal to customize a transaction being conducted by the user at the transaction terminal.

In an embodiment, at 241, the dynamic tag-based identification transaction manager provides the mobile device identifier to an account manager (e.g., account manager 141) that manages a user account and that is linked to the mobile device identifier by the account manager. Here, the account manager may directly send the preferences obtained from the user account to the transaction terminal or the account manager may send the preferences to the dynamic tag-based identification transaction manager, which then sends the preferences to the transaction manager.

In an embodiment, at 242, the dynamic tag-based identification transaction manager provides identifying information (e.g., email, phone number, user account identifier, etc.) that is linked by the dynamic tag-based identification transaction manager to the mobile device identifier to an account manager (e.g., account manager 141). The account manager manages a user account that includes the preferences, and the account manager links the user identifying information to the user account. The preferences obtained from the user account are sent from the account manager to the transaction terminal or sent from the account manager to the dynamic tag-based identification transaction manager, which then sends the preferences to the transaction terminal.

In an embodiment, at 243, the dynamic tag-based identification transaction manager interacts with an account manager (e.g., account manager 141) that manages a user account for the user utilizing the mobile device identifier and in response to that interaction receives from the account manager the preferences from the user account. The dynamic tag-based identification transaction manager then sends the preferences to the transaction terminal.

In an embodiment, at 244, the dynamic tag-based identification transaction manager sends the mobile device identifier to the transaction terminal. The transaction terminal then acquires the preferences from an account manager (e.g., account manager 141) utilizing the mobile device identifier.

In an embodiment, at 250, the dynamic tag-based identification transaction manager maintains the dynamic identifier as a current-used identifier for the transaction terminal. The dynamic tag-based identification transaction manager also maintains a last-used identifier reported by the transaction terminal before the dynamic tag-based identification transaction manager obtained the current-used identifier from the transaction terminal. This ensures that the dynamic tag-based identification transaction manager can cause the preferences to be sent to the transaction terminal when the dynamic identifier changes between 210 and 220, such that the last-used identifier can be processed to correctly identify the transaction terminal. That is, the transaction terminal may be configured to asynchronously change the dynamic identifier and between the time that the dynamic tag-based identification transaction manager receives the dynamic identifier with the mobile device identifier, the dynamic identifier may change before the dynamic tag-based identification transaction manager causes the preferences to be provided to the transaction terminal for the transaction with the user.

Figure 3:
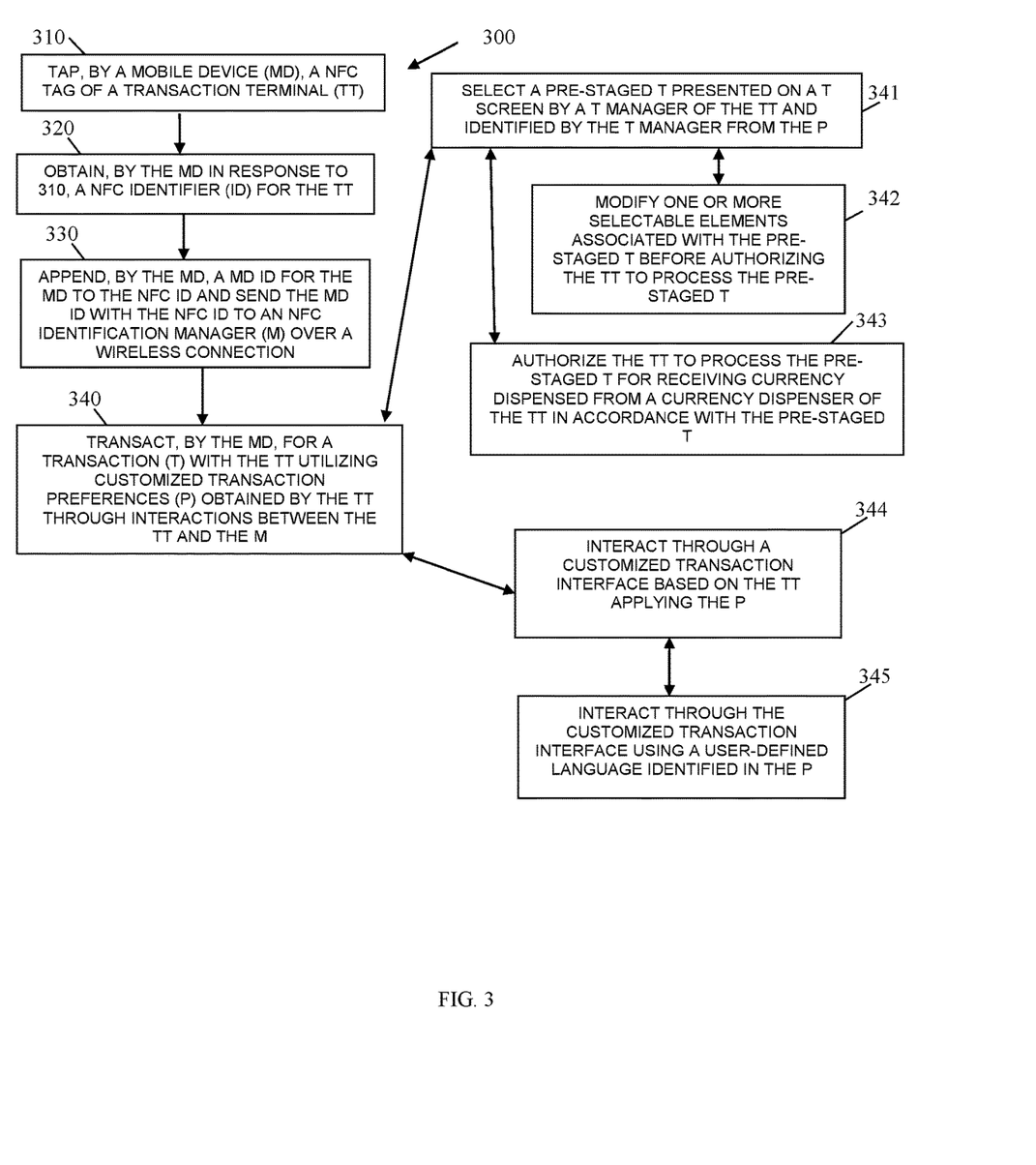
FIG. 3 is a diagram of another method for dynamic tag-based identification for self and assisted transaction processing, according to an example embodiment.

FIG. 3 is a diagram of another method 300 for dynamic tag-based identification for self and assisted transaction processing, according to an example embodiment. The software module(s) that implement the method 300 is referred to herein as a "transaction application (app)." The transaction app is implemented as executable instructions and programmed within memory and/or a non-transitory computer-readable (processor-readable) storage medium that executes on one or more processors of a device. The processors of the device are specifically configured to execute the transaction app. The transaction app has access one or more networks; the networks are wireless.

In an embodiment, the transaction app is the transaction app 122.

In an embodiment, the device that executes the transaction app is the user-operated device 120.

At 310, the mobile device that processes the transaction app is tapped against and NFC tag of a transaction terminal. This wakes up the transaction app or initiates the transaction app on the mobile device.

At 320, the transaction app obtains in response to 310 a NFC tag identifier for the transaction terminal once an NFC reader reads the NFC tag.

At 330, the transaction app appends a mobile device identifier for the mobile device to the NFC tag identifier for the transaction terminal and sends to an NFC identification manager (such as identification manager 111 or the method 200 (representing an instance of the identification manager 111)). The mobile device identifier and the NFC tag identifier is sent from the mobile device to the NFC identification manager over a wireless network connection.

At 340, the transaction app transacts for a transaction with the transaction terminal utilizing customized transaction preferences (preferences) that are specific to the user. The preferences obtained by the transaction terminal through the interactions discussed above with the FIG. 1 and the method 200. Such that, the preferences may be provided directly from the NFC identification manager or indirectly through the NFC identification manager through the account manager 141.

In an embodiment, at 341, the transaction app selects a pre-staged transaction presented on a transaction screen by a transaction manager (e.g., transaction manager 131) of the transaction terminal. The pre-staged transaction identified by the transaction manager from the preferences or a link included in a field of the preferences. The transaction screen may be presented on a display of the transaction terminal or may be presented on a display of the mobile device through the transaction app that interacts with the transaction manager over a wireless connection at the transaction terminal.

In an embodiment of 341 and at 342, the transaction app modifies one or more selectable elements associated with the pre-staged transaction before authorizing the transaction terminal to process the pre-staged transaction on the transaction terminal.

In an embodiment of 341, and at 343, the transaction app authorizes the transaction terminal to process the pre-staged transaction for receiving currency dispensed from a currency dispenser of the transaction terminal in accordance with the pre-staged transaction.

In an embodiment, at 344, the transaction app interacts through a customized transaction interface based on the transaction terminal applying or configuring the preferences into the interface for the transaction between the user and the transaction terminal. Again, the interface may be presented on a display of the transaction terminal or may be presented on a display of the mobile device.

In an embodiment of 344 and at 345, the transaction app interacts through the customized interface using a user-defined language (written and/or spoken) that is identified in the preferences.

Figure 4:
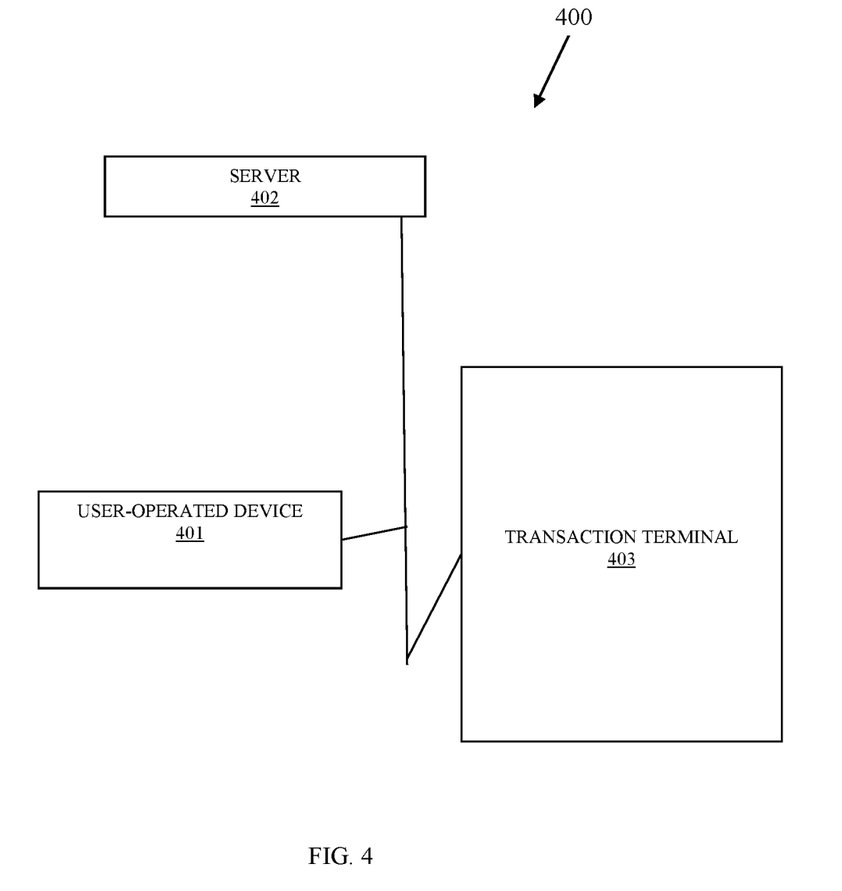
FIG. 4 is a diagram of a system for dynamic tag-based identification for self and assisted transaction processing, according to an example embodiment.

FIG. 4 is a diagram of a system 400 for dynamic tag-based identification for self and assisted transaction processing, according to an example embodiment. Some components of the system 400 are programmed and reside within memory and/or a non-transitory computer-readable medium and execute on one or more processors of the system 400. The system 400 also has access and can communicate over one or more networks; and the networks are wireless and/or wired.

The system 400 implements, inter alia, the processing discussed above with the FIGS. 1-3.

The system 400 includes a user-operated device 401, a server 402, and a transaction terminal 403.

In an embodiment, the user-operated device 401 executes on one or more hardware processors the transaction app 122 and/or the method 300.

In an embodiment, the server 402 executes on one or more hardware processors the identification manager 111, the registration manager 112, the account manager 141, and/or the method 200.

In an embodiment, the transaction terminal 403 executes on one or more hardware processors the NFC ID manager 133 and the transaction manager 131.

In an embodiment, the user-operated device 401 includes an OS that supports NFC processing with an NFC reader of the device 401.

In an embodiment, the transaction terminal 403 includes an OS that supports NFC processing and includes the NFC reader/writer 132 with a dynamic tag chip (I2C interface).

The transaction terminal 401 includes a NFC reader/writer 404.

The transaction terminal 401 is configured to: (a) dynamically change a NFC tag identifier that identifies the transaction terminal 401 using the NFC reader/writer 404, (b) send a current NFC tag identifier to the server 402, and (c) customize a transaction interface for a transaction of a user utilizing customized transaction preferences associated with the user.

The user-operated device 403 is configured to: (a) read the current NFC tag identifier from the transaction terminal 401 and (b) send the current NFC tag identifier and a device identifier for the user-operated device 403 to the server 402.

The server 402 is configured to: (a) receive the current NFC tag identifier with the device identifier as an indication of a start of the transaction at the transaction terminal 401 and (b) cause the customized transaction preferences to be sent to the transaction terminal 401 based on at least the device identifier for the user-operated device 403.

In an embodiment, the transaction terminal 401 is one of: a SST, an ATM, a kiosk, and a POS terminal operated by an assistant that assists the user with the transaction at the POS terminal.

In an embodiment, the user-operated device 402 is one of: a phone, a tablet, a wearable processing device, and a portable device that is an Internet-of-Things (IoT) and NFC-enabled device, such as a key fob or a USB device.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a server from a non-transitory computer-readable storage medium causing the processor to perform operations comprising:
receiving a dynamic identifier associated with a transaction terminal from the transaction terminal, wherein receiving the dynamical identifier further includes receiving the dynamic identifier as a Near Field Communication (NFC) tag identifier that was generated by and supplied by the transaction terminal for a next transaction at the transaction terminal, wherein the dynamic identifier replaces a previous or last recorded dynamical identifier maintained for the transaction terminal and the dynamic identifier generated and provided by the transaction terminal when the transaction terminal completes a last transaction on the transaction terminal, wherein the terminal is a Self-Service Terminal (SST);
obtaining the dynamic identifier with a mobile device identifier from a mobile device based on the mobile device wirelessly obtaining the dynamic identifier from the transaction terminal to initiate a transaction between a user who operates the mobile device and the transaction terminal, wherein the transaction identified as the next transaction at the transaction terminal by the dynamic identifier, wherein the transaction is a self-service transaction being performed by the user at the SST;

linking customized transaction preferences for the user to the mobile device identifier by obtaining user identifying information associated with the mobile device identifier;

causing the customized transaction preferences to be provided to the transaction terminal by using the user identifying information and causing the transaction terminal to obtain the customized transaction preferences from a user account associated with the transaction terminal, wherein the transaction terminal initiates the transaction as the next transaction and customizes transaction processing for the transaction of the user at the transaction terminal based on the transaction terminal obtaining the customized transaction preferences from the user account, and wherein the customized transaction preferences comprise a payment method registered to the user account, a user-defined font-size for information presented on a display screen by the SST during the transaction, and a user-defined brightness for the information presented on the display screen by the SST during the transaction, and wherein the transaction terminal utilizes the payment method for a payment of the transaction, and presents the information for the transaction on the display screen in the user-defined font-size and with the user-defined brightness;

wherein causing further includes providing the user identifying information linked to the mobile device identifier to an accounts manager that manages the user account that is linked to the user identifying information, wherein the customized transaction preferences are sent from the accounts manager to the transaction terminal;

wherein the transaction is processed by the transaction terminal using the payment method for the payment without the user providing a payment card wirelessly, manually, or through a card reader to the transaction terminal during the transaction based on the payment method.

2. The method of claim 1, wherein receiving further includes receiving the dynamic identifier to replace a previously-recorded identifier for the transaction terminal from the transaction terminal at predefined intervals.

3. The method of claim 1, wherein receiving further includes receiving the dynamic identifier to replace a previously-recorded identifier for the transaction terminal from the transaction terminal based on a predefined event detected by the transaction terminal.

4. The method of claim 1, wherein obtaining further includes receiving the dynamic identifier and the mobile device identifier from a mobile application that executes on the mobile device when the mobile device reads the dynamic identifier from the transaction terminal to initiate the transaction between the user and the transaction terminal.

5. The method of claim 1, wherein linking further includes providing the mobile device identifier to the accounts manager, wherein the accounts manager maps the mobile device identifier to the user account, and wherein the user account comprises the customized transaction preferences for the user.

6. The method of claim 1, wherein linking further includes mapping the mobile device identifier to an accounts manager and providing the user identifying information registered to the user with the mobile device identifier to the accounts manager, wherein the accounts manager maps the user identifying information to the user account, and wherein the user account comprises the customized transaction preferences for the user.

7. A method comprising:

providing executable instructions to a processor of a server from a non-transitory computer-readable storage medium causing the processor to perform operations comprising:

receiving a dynamic identifier associated with a transaction terminal from the transaction terminal, wherein receiving the dynamical identifier further includes receiving the dynamic identifier as a Near Field Communication (NFC) tag identifier that was generated by and supplied by the transaction terminal for a next transaction at the transaction terminal, wherein the dynamic identifier replaces a previous or last recorded dynamical identifier maintained for the transaction terminal and the dynamic identifier generated and provided by the transaction terminal when the transaction terminal completes a last transaction on the transaction terminal, wherein the transaction terminal is a Self-Service Terminal (SST);

obtaining the dynamic identifier with a mobile device identifier from a mobile device based on the mobile device wirelessly obtaining the dynamic identifier from the transaction terminal to initiate a transaction between a user who operates the mobile device and the transaction terminal, wherein the transaction identified as the next transaction at the transaction terminal by the dynamic identifier, wherein the transaction is a self-service transaction being performed by the user at the SST;

linking customized transaction preferences for the user to the mobile device identifier by obtaining user identifying information associated with the mobile device identifier;

causing the customized transaction preferences to be provided to the transaction terminal by using the user identifying information and causing the transaction terminal to obtain the customized transaction preferences from a user account associated with the transaction terminal, wherein the transaction terminal initiates the transaction as the next transaction and customizes transaction processing for the transaction of the user at the transaction terminal based on the transaction terminal obtaining the customized transaction preferences from the user account, and wherein the customized transaction preferences comprise a payment method registered to the user account, a user-defined font-size for information presented on a display screen by the SST during the transaction, and a user-defined brightness for the information presented on the display screen by the SST during the transaction, and wherein the transaction terminal utilizes the payment method for a payment of the transaction, and presents the information for the transaction on the display screen in the user-defined font-size and with the user-defined brightness;

wherein causing further includes sending the mobile device identifier to the transaction terminal, wherein the transaction terminal acquires the customized transaction preferences from an accounts manager by the transaction terminal providing the mobile device identifier to the accounts manager and receiving the customized transaction preferences back from the accounts manager;

wherein the transaction is processed by the transaction terminal using the payment method for the payment without the user providing a payment card wirelessly, manually, or through a card reader to the transaction terminal during the transaction based on the payment method.

8. The method of claim 7 further comprising, maintaining the dynamic identifier as a current-used identifier by the transaction terminal and maintaining a last-used identifier reported by the transaction terminal ensuring that when the dynamic identifier changes between the receiving of the dynamic identifier and the obtaining of the dynamic identifier that the last-used identifier can be processed to properly identify the transaction terminal.

* * * * *